Figure 1:
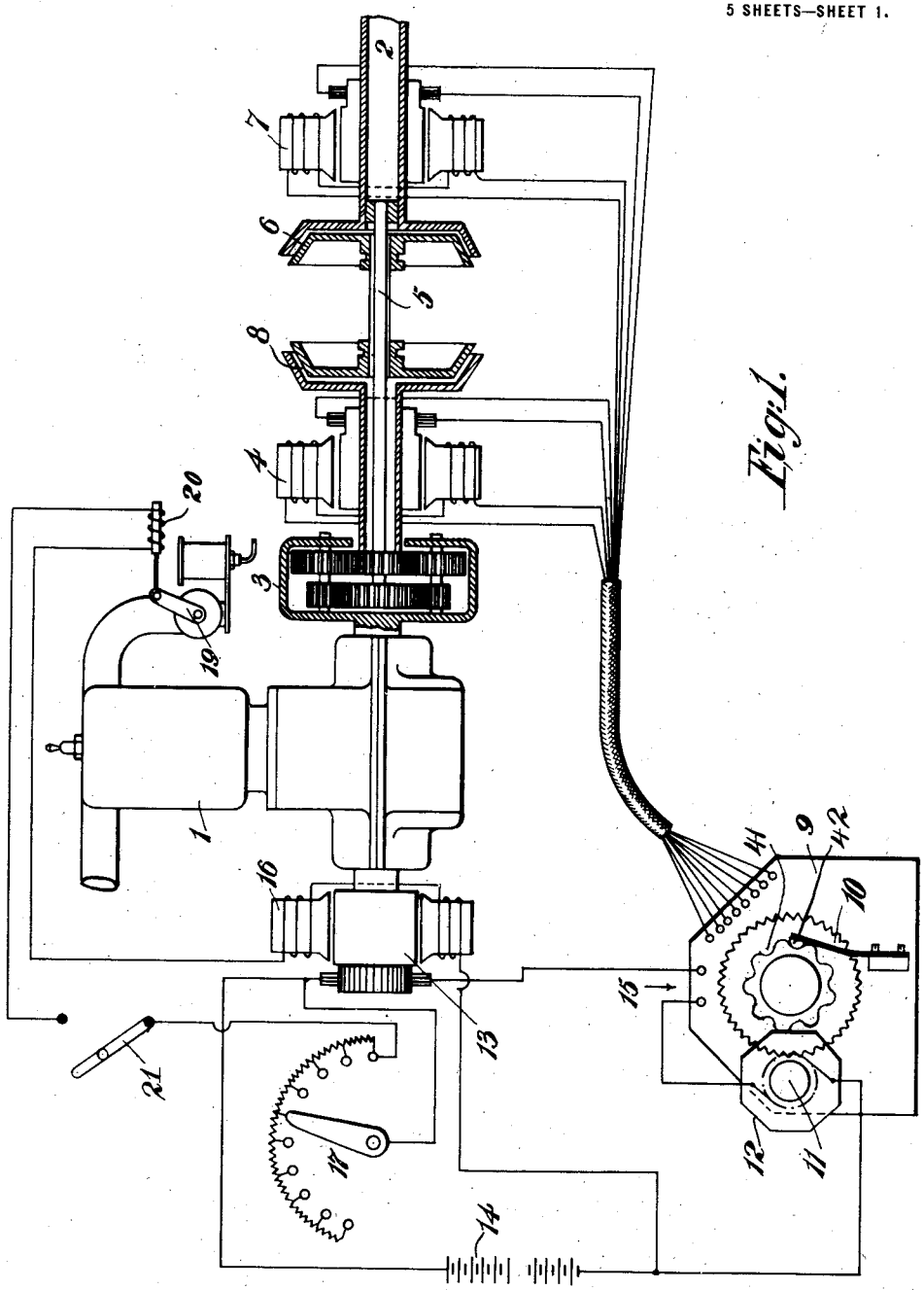

J. G. P. THOMAS.
VARIABLE SPEED POWER TRANSMISSION.
APPLICATION FILED MAR. 1, 1913.

1,165,038.

Patented Dec. 21, 1915.
5 SHEETS—SHEET 2.

Fig. 2.

J. G. P. THOMAS.
VARIABLE SPEED POWER TRANSMISSION.
APPLICATION FILED MAR. 1, 1913.

1,165,038.

Patented Dec. 21, 1915.
5 SHEETS—SHEET 3.

Witnesses.
M. E. Elwood
James M. Shea

Inventor
John Godfrey Parry Thomas
per Eugene C. Brown
Attorney

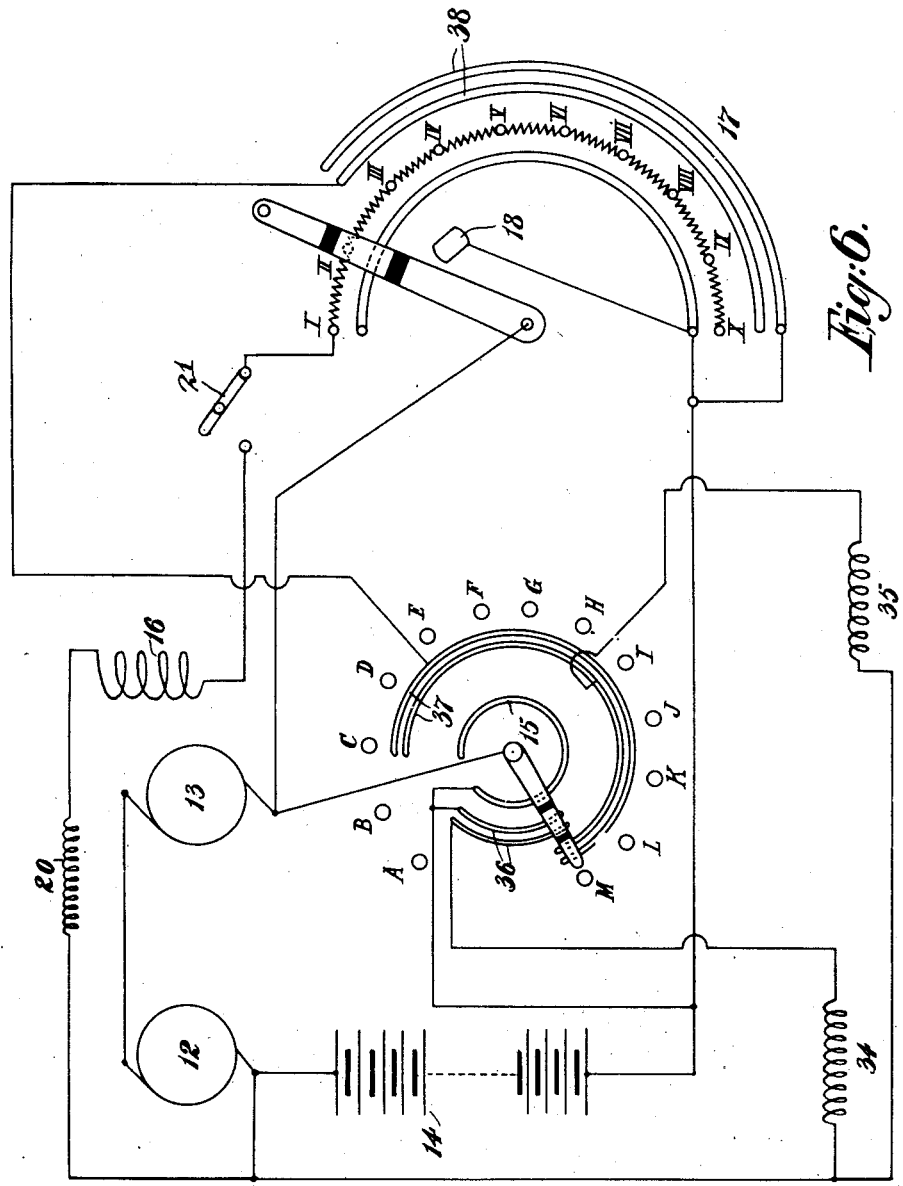

UNITED STATES PATENT OFFICE.

JOHN G. P. THOMAS, OF CHISWICK, LONDON, ENGLAND.

VARIABLE-SPEED POWER TRANSMISSION.

1,165,038.        Specification of Letters Patent.     Patented Dec. 21, 1915.

Application filed March 1, 1913. Serial No. 751,618.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in Variable-Speed Power Transmission, of which the following is a specification.

Certain prime motors, in particular internal combustion engines, run efficiently only at a particular speed, or speaking generally have a maximum efficiency at a particular speed for any given output. In order to use such prime motors economically in the driving of variable loads, it is necessary and usual to interconnect them with their load shafts through means which permit variation of the speed ratio of the motor and shaft, and the driver in charge of the motor alters the speed ratio according as the torque called for at the load shaft varies.

The first purpose of the present invention is to enable the required variations in speed ratio to be brought about automatically. To this end the speed varying apparatus is made dependent upon the condition of the system so that the speed ratio automatically alters in the manner required to permit the prime motor to operate under the best conditions. For many purposes, for instance for the driving of vehicles, the range of variation of load may be such that it is not practicable or desirable to permit the prime motor always to exert its full power.

The invention therefore further comprises means for altering the condition of the prime motor which the automatic apparatus tends to maintain.

The invention is particularly applicable to rail motor cars in which the prime motor is an internal combustion engine connected with the driving wheels by means, such as the electromechanical transmission system described in my earlier United States Patent No. 948436, dated 8th February 1910, which permit variation of the speed ratio between the engine and the wheels. As it may not infrequently be desirable to have the transmission system upon one vehicle controlled from another vehicle, an electrical method of control is adopted. This comprises an electric motor geared to the controlling device which varies the speed ratio, and a generator driven by the prime motor connected in series with the controller motor with a battery in its circuit opposing it. It will be clear that the controller motor will be put in action whenever the voltage of the auxiliary generator exceeds or falls below that of the battery, the battery voltage determining the speed at which the prime motor shall be automatically maintained. In order to vary the speed, a master controller may be provided at any desired point, whether on the same or another vehicle, with connections which enable it either to vary the voltage of the battery by cutting out cells or, what serves the same purpose, to vary the strength of the field of the auxiliary generator. This application of the invention is illustrated by way of example in the accompanying drawings, in which—

Figure 3:
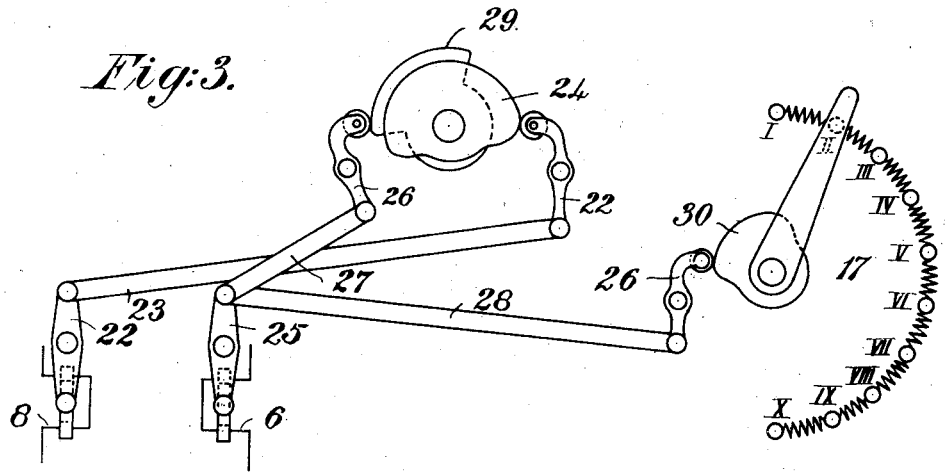
Figure 4:
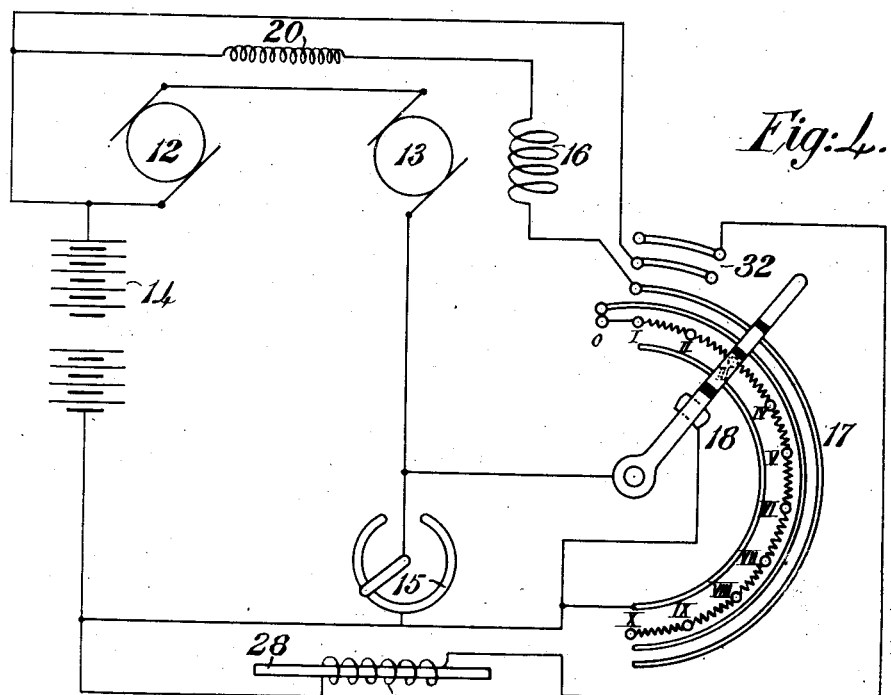
Figure 5:
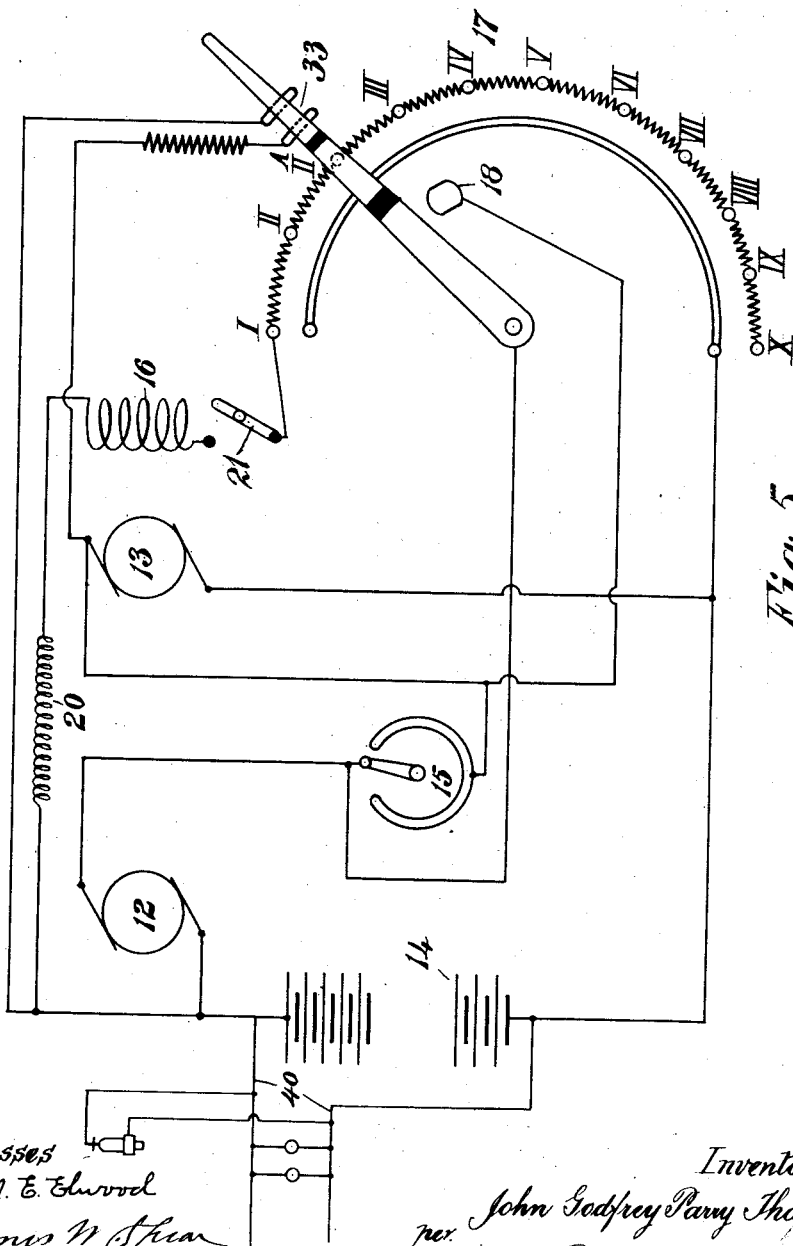

Figure 1 is a diagrammatic representation of the main parts of the system. Fig. 2 is a diagram of the electrical connections. Fig. 3 shows diagrammatically certain mechanical connections. Figs. 4, 5 and 6 illustrate modifications of the electrical connections.

In the arrangement of Fig. 1 the prime motor is indicated as an internal combustion engine 1 which is connected through an electromechanical transmission gear substantially like that described in my earlier specification No. 948436 with a shaft 2 geared to the road wheels of a vehicle. An epicyclic gearing 3 connects the shaft of the prime motor on the one hand to the shaft of an electrical machine 4 and on the other hand to a shaft 5 which is normally coupled by the clutch 6 to the shaft 2 which carries the armature of an electrical machine 7. A further clutch 8 serves by joining the shaft 5 to the shaft of the machine 4 to put the gearing 3 out of action. This transmission mechanism constitutes a means whereby the speed of the shaft 2 may be varied without alteration of the speed of the prime motor 1. Such variation is effected by a suitable variation of the electrical conditions of the machines 4 and 7, the fields and armatures of which are for this purpose joined to a controller 9 which in the usual way inserts resistances in the circuits of the machines and generally makes such connections as are required for the particular system of control. This controller is operated by the rotation of a gear wheel 10 upon its shaft, each tooth in such gear wheel conveniently corresponding to one notch of the controller.

For the purpose of the present invention, the controller 9 is operated through its gear wheel 10 by a single tooth pinion 11 on the shaft of the small motor 12 which may have permanent magnets or be excited from any suitable source. A suitable ratchet 41 on the controller shaft engaged by a spring pressed stop 42 insures the controller moving a complete notch at a time. The motor is supplied with current from the armature 13 of a dynamo secured upon the shaft of the prime motor 1; but the circuit also includes a battery 14 which normally opposes the generator 13. There is also in the circuit a contact in the controller 9 indicated in Fig. 2 at 15. This contact is always made except when the controller 9 is in the neutral position and is therefore indicated as consisting of an arm on the shaft of the controller contacting with an interrupted circular contact. The field 16 of the generator 13 is supplied from any suitable source, for instance the battery 14, and is controlled by a rheostat 17 which constitutes the chief element of the master controller. This master controller is more fully indicated in Fig. 2 from which it will be apparent that movement of the handle not only varies the amount of the resistance 17 included in the circuit of the field 16, through the end insulated portion of the handle bridging between the resistance studs and a contact arc, but also in one position makes an independent contact 18,—between the other metallic portion of the handle and a stud,—in parallel with the contact 15. The field circuit also includes a switch 21 which is operable by hand but only when the master controller is in the first position. This enables the field circuit to be interrupted by hand, so that current is not uselessly taken from the battery when the engine is stopped.

Where the prime motor is an internal combustion engine it may be desirable to make the control of the transmission gear affect also the control of the prime motor so that the engine may not be run at a low speed with the throttle wide open. For this purpose the carbureter throttle valve 19 may be controlled for example by means of a solenoid 20.

It will easily be understood that the rotation of the motor 12 is dependent upon the existence of a difference of E. M. F. between the generator armature 13 and the battery 14. Supposing the system to be in normal running condition, that is both the prime motor and the load shaft in rotation, it is clear that at a certain speed of the prime motor the E. M. F. of the armature 13 will exactly equal that of the battery 14 and so long as that condition is maintained the controller 9 will remain stationary. If the speed of the load shaft should diminish, for instance due to the vehicle meeting an adverse gradient, there will at first be a tendency to reduce the speed of the prime motor, with the result that the battery 14 will overcome the armature 13 causing current to pass through the motor 12 which will rotate and shift the controller 9. The direction of the rotation of the motor 12 under these conditions is such as to increase the speed ratio between the prime motor and the load shaft, and the motion of the controller will clearly continue until the prime motor has again attained its former speed, the load shaft however, rotating more slowly. In the event of the load shaft gaining in speed the opposite effect would occur, in all cases the controller 9 being so shifted as to bring back the prime motor to a particular speed, viz. the speed at which the voltage of the armature 13 balances that of the battery 14.

Under some circumstances it may be desired to vary the speed at which the prime motor runs and at which the automatic control device tends to maintain it. Such variation is effected by the aid of the master controller, which in actual construction may, like the controller 9, resemble the controller described in my United States Patent No. 1005084 dated 3rd October 1911. The insertion of resistance in the circuit of the field 16 will obviously diminish the voltage of armature 13 for a given speed so that the prime motor will need to attain a higher speed before the voltage of the battery 14 is balanced. At the instant when such a weakening of field 16 is brought about the battery will overpower the generator and will operate the controller 9 as above described so as to increase the speed ratio between the prime motor and the shaft 2 with the result in this case that on the cessation of the controller movement the prime motor will be rotating at a higher speed at which it will thenceforward tend to be maintained by the automatic operation of the apparatus.

It is highly undesirable to permit an internal combustion engine to be run at a low speed with the carbureter throttle fully open. To prevent this, the throttle is interconnected with the master controller by means of the solenoid 20 which is shown as in the circuit of the field 16. If this field is strengthened so as to cause the prime motor 1 to run at a low speed the solenoid 20 attracts its armature and partially or wholly closes the throttle 19.

So far as the invention has now been described it is obviously applicable to any power transmission apparatus in which there is a device for varying the speed ratio between the prime motor and the load shaft; with the exception that the throttle control last above described naturally applies only to systems having an internal combustion engine as prime motor. In general each transmission system will have its peculiar advantages which may by suitable provision be retained with the automatic control above described. For instance where the prime motor is an internal combustion engine the transmission mechanism will preferably permit of the prime motor being run light, i. e. separated from the load shaft, and may also provide for the automatic starting of the prime motor. By way of illustration of the application of the invention in such cases the peculiarities of its application to the transmission mechanism illustrated will now be described.

In the particular transmission mechanism illustrated the prime motor 1 can be run light by releasing the clutch 6; and it can be automatically started in various ways, for example by putting in the clutch 8 while the clutch 6 is out and driving the machine 4 as a motor from the battery 14 or another source of supply. In order that the control by the apparatus described may extend to these operations, the clutch 8 is interconnected with the controller 9 so that it is engaged only when the controller 9 is in one of its extreme positions, i. e. either the top speed position or the position for starting the engine; and the clutch 6 is interconnected with both the controller 9 and the master controller 17 so as to be held out by the controller 9 when it is in the engine starting position or the next position (the position for running light) while when once engaged the controller 9 is unable to operate it and it can be released only by movement of the master controller to the second or first notch. These interconnections may be of various kinds. In Fig. 3 a mechanical interconnection by means of cams is shown. The clutch 8 is joined through levers 22 and a rod 23 to a roller lying in the path of a cam 24 which is fast upon the shaft or axle of the controller 9 so as to be rotated when the controller is turned. The clutch 6 is similarly connected through levers 25 and 26, and rods 27, 28 both to a roller in the path of a cam 29 on the shaft of controller 9 and also to a roller in the path of a cam 30 on the shaft of the master controller 17. This drawing is but diagrammatic, but it may easily be seen that by suitable shaping of the respective cams the clutches can be held out or allowed to be put in at the appropriate times merely by the rotation of the controller. It will be noted that cam 29 is formed without sloping shoulders with the result above indicated that once clutch 6 is engaged movement of the controller 9 cannot throw it out. It is, however, equally possible to operate the clutches by power instead of by hand for example by electromagnetic means. For instance Fig. 4 shows an electromagnetic connection between clutch 6 and the master controller 17. A solenoid 31 acts directly or through any suitable means upon say the rod 28 of Fig. 3. The winding of the solenoid is bridged across the battery 14 but has in its circuit a contact 32 which is completed only when the master controller is on the first or second notch. An extension of this modification to the case of electromagnetic clutches is described hereinafter with reference to Fig. 6.

The field 16 is conveniently designed to be substantially saturated when the master controller is on the second notch (marked II in Fig. 2); so that the movement of the master controller from notch II to notch I though it increases the current in the circuit of field 16 does not substantially alter the E. M. F. of the armature 13 for a given speed. If the master controller is brought down to notch II from any higher notch the throttle will be very nearly closed and the field 16 will be brought up to full strength while the clutch 6 will be released. The strengthening of the field would tend to operate controller 9 in such a fashion as to decrease the speed ratio between the prime motor and the load shaft; but this effect is nullified by the closing of the throttle. The condition of the throttle is such that it permits the engine to run light at a speed of say 100 revolutions per minute and at this speed with the field 16 at full strength the E. M. F. of the battery is greater than that of the armature 13. Consequently the controller 9 will be rotated in the direction required to increase the speed ratio between the prime motor and load shaft, but as the speed of the prime motor is now determined by the throttle alone this action of the controller will have no effect and will continue until the controller is brought to the neutral position. In this position the contact 15 is broken so that there is no longer current in the circuit of the machine 12. If the master controller is brought down to notch I the increase of current in the circuit of field 16, while not further appreciably affecting the E. M. F. of armature 13, increases the attraction of solenoid 20 and causes it to completely close the throttle 19 so that the prime motor stops. When it has stopped there is no need to keep the throttle closed and no need to have a current flowing through the field 16 or solenoid 20; the circuit may therefore be broken by opening the hand switch 21. Obviously if desired this switch could be operated automatically. For instance the master controller may be built with an extra end notch as indicated at O in Fig. 4, upon which the circuit of the field 16 is broken.

Supposing the prime motor to have been running light, it is obvious that the automatic control cannot recommence until the circuit of motor 12 is closed. It is for this reason that contact 18 is provided in parallel with contact 15. This contact is made when the master controller is brought to notch III, and this same action, while slightly weakening the field 16, opens the throttle 19 and permits the clutch 6 to engage, always supposing the switch 21 has first been closed. The clutch 6 does not at once engage being still held out by the controller 9. The condition of the throttle is now such that if running light the engine will assume a speed of about 500 revolutions; and the condition of the field 16 is such that the battery E. M. F. is balanced at a speed of about 300 revolutions. The result is that the armature 13 overpowers the battery 14 so that the controller 9 is rotated in the direction for decreasing the speed ratio between the prime motor and load shaft. This movement causes the clutch 6 to engage so that the whole system begins running on the lowest running notch. The motion of the controller will continue until the speed of the prime motor is brought down to about 300 revolutions.

If the prime motor has been completely stopped it is necessary first to restart it. This can conveniently be done by the provision of an engine starting notch on the controller 9 which should be beyond the neutral position. Upon this engine starting notch the clutch 8 is engaged and the clutch 6 disengaged while electrical circuits are made for driving the machine 4 as above mentioned. To bring the controller 9 to this notch after the engine has been stopped, it is sufficient to move the master controller to notch III. The circuit of the motor 12 is then closed and as the armature 13 is not rotating the battery 14 presents the only E. M. F. in the circuit. The controller 9 is therefore rotated in the direction which on the higher notches increases the speed ratio between prime motor and load shaft. Hence the controller is rotated backward beyond the neutral position into the engine starting position. If the switch 21 has been duly closed the engine starts and if the master controller is kept on notch III will run up toward a speed of 500 revolutions. In so doing it will cause armature 13 to overpower the battery 14 and the further operation of the controller 9 will be effected as above described. Should the switch 21 have been left open, as might happen with the arrangement of Fig. 2, the engine may not start because the throttle is wide open; the driver then has to return the master controller to notch I in order to close the switch and recommence.

If desired a further notch could be provided between notches II and III on the master controller which would enable the engine to run at an increased speed with the clutch 6 still disengaged. Upon this notch the power of the engine could be employed through one of the electrical machines for charging the battery 14. This is illustrated by the notch II\a in Fig. 5. It will be noted that upon that notch the controller 17 completes a contact 33 by which the generator 13 on the shaft of the prime motor is joined through a suitable resistance across the battery 14 to charge it. It will be obvious that the controller could make any further necessary changes in the field rheostat and so forth which might be necessary for any particular purpose.

Naturally the battery may be employed not only to start the engine and to work the controller but also through the conductors 40 to supply the lights on the vehicle, and the ignition of the engine.

It will be obvious that the throttle 19 might be interconnected with the master controller mechanically instead of electrically, for instance substantially in the manner indicated for the clutches.

If electromagnetic clutches are used their circuits may readily be controlled by contacts in the respective controllers. In Fig. 6, 34 indicates the winding of a magnetic clutch in the place of clutch 8, and 35 that of a magnetic clutch replacing clutch 6. The winding 34 is connected across the battery 14 through a contact 36 in the controller 9. The winding 35 has in its circuit both a contact 37 in the controller 9, and in series with that a contact 38 in the controller 17. In the diagram of controller 9, A indicates the engine starting position, B, the neutral position in which the controller rests when the apparatus is not working. D to L are the running notches corresponding to different connections in the controller by which different speeds are obtained from the electromechanical transmission mechanism; and M is the top speed or direct drive.

The clutch 8 should be engaged in the engine starting position and on the top speed but at no other time; it will be noted that the position and extent of the contact 36 fulfils this condition. The clutch 6 on the other hand has to be held out in the engine starting position and in the position for running light, and accordingly the contact 37 does not extend to these positions. It does extend, however, to a notch C beyond the lowest running notch, so that the clutch is engaged before the transmission gear is made operative. But further the clutch 6 must be taken out if the controller 17 is brought down to notch II or I; hence the contact 38 is in series with the contact 37 and does not extend to these last named notches.

What I claim is:

1. In combination, a prime motor, a load shaft, variable speed power transmission mechanism interconnecting said prime motor and load shaft, an electric generator driven by said prime motor, a battery and a motor in the circuit of said generator, and means operated by said motor varying the speed ratio of said power transmission mechanism.

2. In combination, a prime motor, a load shaft, variable speed electromechanical power transmission mechanism interconnecting said prime motor and load shaft, a controller for varying the speed ratio of said mechanism, an electric generator driven by said prime motor, a battery and a motor in the circuit of said generator, and means interconnecting said motor and the controller.

3. In combination, a prime motor, a load shaft, variable speed power transmission mechanism interconnecting said prime motor and load shaft, a generator driven by said prime motor, a motor and battery in the circuit of said generator, the battery opposing the generator, means enabling said motor to vary the speed ratio of the transmission mechanism, and means for altering the speed at which the generator balances the battery.

4. In combination, a prime motor, a load shaft, variable speed power transmission mechanism interconnecting said prime motor and load shaft, a generator driven by said prime motor and having a field winding, a motor and battery in the circuit of said generator, the battery opposing the generator, means enabling said motor to vary the speed ratio of the transmission mechanism, means for altering the speed at which the generator balances the battery, and means for varying the field of said generator.

5. In combination, a prime motor, a load shaft, variable speed power transmission mechanism interconnecting said prime motor and load shaft, a generator driven by said prime motor, means operated by said generator for varying the speed ratio of said power transmission mechanism so as to keep the speed of the prime motor substantially constant, and means for varying such speed of the prime motor.

6. In combination, an internal combustion engine, a load shaft, variable speed transmission mechanism interconnecting said engine and load shaft, means controlled by the speed of said engine for varying the speed ratio of said mechanism so as to keep the engine speed substantially constant, means for altering the speed at which the engine is maintained, and means for simultaneously operating the throttle of said engine.

7. In combination, a prime motor, a load shaft, variable speed transmission mechanism interconnecting said prime motor and load shaft, control devices for automatically varying the speed ratio of said transmission mechanism so as to maintain the prime motor at substantially constant speed, and means for varying the speed at which said control devices tend to maintain the prime motor.

8. In combination, an internal combustion engine, a load shaft, variable speed transmission mechanism interconnecting said engine and load shaft, a controller for varying the speed ratio of said transmission mechanism, a generator driven by said engine, a battery and motor in the circuit of said generator, connections between said motor and the controller, and means for altering simultaneously the condition of the prime motor and the action of said generator, battery and motor for a given speed of the engine.

9. In combination, a prime motor, a load shaft, variable speed power transmission mechanism interconnecting said prime motor and load shaft, a controller for varying the speed ratio of said mechanism, a generator driven by the prime motor, a battery and motor in the circuit of said generator, gearing connection between said motor and said controller, a field winding for said generator, and a rheostat controlling the current through said field winding.

10. In combination, an internal combustion engine, a load shaft, a variable speed power transmission mechanism interconnecting said engine and load shaft, a controller for varying the speed ratio for said mechanism, a generator driven by the engine, a battery and motor in the circuit of said generator, gearing connection between said motor and said controller, a field winding for said generator, an electromagnetic controlling device in series with said field winding and connected with the throttle of the engine, and a rheostat controlling the current through said field winding and electromagnetic controlling device.

11. In combination, a prime motor, a load shaft, a variable speed power transmission mechanism interconnecting said prime motor and load shaft, a controller for varying the speed ratio of said mechanism, a generator driven by the prime motor, a battery and motor in the circuit of said generator, gearing connection between said motor and said controller, and a contact in said circuit closed by said controller except when it is in the neutral position.

12. In combination, a prime motor, a load shaft, a variable speed power transmission mechanism interconnecting said prime motor and load shaft, a controller for varying the speed ratio of said mechanism, a generator driven by the prime motor, a field winding for said generator, a battery and motor in the circuit of said generator, a contact in said circuit closed by said controller except when it is in the neutral position, a rheostat in the circuit of said field winding and a contact in parallel with the contact in the controller closed in the operation of said rheostat.

13. In combination, an internal combustion engine, a load shaft, a variable speed power transmission mechanism interconnecting said engine and load shaft, a controller for varying the speed ratio of said transmission mechanism, means for automatically actuating said controller to maintain the output of the engine constant, an independent source of energy, and means actuated by said controller for starting said engine from said independent source.

14. In combination, a prime motor, a load shaft, variable speed power transmission mechanism interconnecting said prime motor and load shaft, a controller for varying the speed ratio of said mechanism, means for actuating the controller automatically, a clutch for disconnecting said prime motor from the load shaft, and means interconnecting said clutch and controller so that the clutch can only be engaged when the controller is in particular positions.

15. In combination, a prime motor, a load shaft, variable speed power transmission mechanism interconnecting said prime motor and load shaft, a controller for varying the speed ratio of said mechanism, means for operating said controller automatically so as to maintain the prime motor at substantially constant speed, a master controller for altering the speed at which the prime motor is maintained, a clutch to disengage said prime motor from the load shaft, and means interconnecting said clutch and said master controller.

16. In combination a prime motor, a load shaft, variable speed power transmission mechanism interconnecting said prime motor and load shaft, a controller for varying the speed ratio of said mechanism, means for actuating the controller automatically, a clutch for joining said prime motor and load shaft to eliminate said mechanism, and means interconnecting said clutch and controller so that said clutch can only be in operation for certain positions of said controller.

17. In combination, a prime motor, a load shaft, variable speed power transmission mechanism interconnecting said prime motor and load shaft, a controller for varying the speed ratio of said mechanism, means for operating said controller automatically, an independent energy reservoir, and means actuated by said controller for storing the energy of said prime motor in said reservoir.

In testimony whereof I have signed my name to this specification in the presence of two subscribing witnesses.

J. G. P. THOMAS.

Witnesses:
   KEN. J. THOMSON,
   A. E. O'DELL.